Patented Sept. 8, 1942

2,295,219

UNITED STATES PATENT OFFICE 2,295,219

PROCESS FOR TREATING METALLURGICAL SLAGS

Bo Michael Sture Kalling, Djursholm, and Per Gustaf Lennart Brannstrom, Skelleftehamn, Sweden No Drawing. Application April 7, 1941, Serial No. 387,356. In Sweden May 10, 1940

12 Claims. (Cl. 75—24)

The present invention relates to a process of treating siliceous slags obtained in the smelting of ores, particularly of the type containing at least one of the elements sulphur and arsenic by methods commonly known as pyrite, matte or speiss smelting, for the purpose of recovering values, and particularly for extracting metals such as Au, Ag, Cu, Ni, Co from the slag.

The "pyrite" or "matte" smelting commonly used for extracting metals from sulphide ores, has for its object to gather the metal or metals to be extracted into a sulphide phase—the "matte"—which is produced simultaneously with an oxide slag rich in iron and silica. It is, however, not possible in this manner to bring all of the metal (by which expression in the following is meant metals other than iron) to collect in the sulphide phase, owing to the equilibrium which is set up between the respective concentrations of metal in the sulphide matte and the siliceous slag. This sometimes causes losses of metal in the slag to an extent which is by no means insignificant. Certain metals, such as Cu, Ag and Au, will fairly completely collect in the matte whereas others, e. g., Co and Ni, to a great proportion are found in the slag. What has been said above regarding slags and mattes obtained in the smelting of pyrites and similar sulphur containing ores is, in a general sense, also true of concentrates obtained in similar metallurgical processes in which ores of the speiss type are treated by smelting.

The present invention has for its object to improve the yield of metal in smelting processes of the kind mentioned, by means of a subsequent treatment of the slag formed in the smelting proper, whereby the advantage is also obtained that the content of metals other than iron in the slag will become reduced to such a degree that the usefulness of said iron containing slag as a possible raw-material for steel production is considerably increased.

The main feature of the process consists in adding to the metal-containing slag, while in a molten condition, a suitable quantity of an iron sulphide compound having a content of non-oxidized iron exceeding 1 atom of iron per each atom of sulphur. In other words, the molten iron sulphide should contain some metallic iron dissolved therein, so that the sulphide mixture will possess a certain "iron activity." The sulphide compound should preferably be substantially free from those metals which are to be extracted from the slag. A large proportion of these metals are hereby transferred to the molten iron sulphide. If the reaction is allowed to reach its state of equilibrium it is possible, even by the use of a comparatively small addition of such a sulphide compound, to obtain very good yields in the matte thus produced, while the percentages remaining in the slag will become insignificant. The following example demonstrates the yields which may be obtained by the new process.

To a slag of normal composition obtained in the smelting of a sulphidic copper ore containing Co, Ag and Au, a quantity of a sulphide compound of above mentioned kind corresponding to 5 per cent of the amount of slag was added, after which a thorough mixing took place. The following percentages of the metals in question hereby became transferred to the simultaneously forming matte:

| | Percent |
|---|---|
| Cu | 81 |
| Co | 67 |
| Au | 71 |
| Ag | 49 |

It is possible, by addition of a larger proportion of the sulphide compound in question, to obtain still better yields. The yield is also increased if the sulphide compound is added in several stages, the matte formed being removed between each fresh addition of sulphide. A certain content of arsenic in the matte has also been found to improve the yield to some extent, particularly in regard to cobalt.

To obtain a sufficiently rapid reaction a mixing of slag and matte must be effected during or after the addition of the sulphide. It has been found that the velocity by which the metal is transferred from the slag to the matte is different for different metals. The time which in a given case is needed for bringing the copper content near its state of equilibrium is, for instance, insufficient to simultaneously produce a satisfactory yield of cobalt. If the highest possible yield of cobalt is desired without too much expenditure of time, a very intense stirring and intermixing of sulphide and slag is a necessary condition.

The stirring may for instance be effected by tapping the slag, preferably from a comparatively high level, into a ladle or receptacle into which the iron sulphide compound is either simultaneously or previously introduced. The slag and matte, or the slag alone, may then be transferred by tapping into a second receptacle while adding a fresh quantity of the sulphide. The sulphide may in each instant be added in the solid state, e. g., in powder form. The speed of the reaction is, however, increased if it is introduced while in a molten condition.

The treatment may also be carried out in a special receptacle, in which case the stirring is either effected by moving the same, e. g., by its rotation, or by means of suitable stirring or mixing devices or by arrangements for introducing a blast of a suitable gas, e. g., of a non-oxidizing or reducing nature, into the molten bath. The stirring may also be effected by means of introducing wooden poles into the bath, as in the known "poling" process. The receptacle is suitably provided with a heating arrangement of some kind, in order to provide for a desired regulating of the temperature of the slag.

The temperature of the slag should in general be kept between 1200° and 1300° C. and should not be higher than is necessary to maintain it in a sufficiently easily flowing condition.

The silica content of the slag should be so high that it will be close to the saturation point at the temperature of treatment. An addition of silica may, therefore, in certain cases be desirable. To obtain a good result it is, furthermore, necessary that the iron in the slag is not present in its three-valent state to any appreciable amount.

It has been found that particularly the yield of cobalt and nickel may be considerably increased if the proportion of iron in the sulphide compound is high compared to its sulphur content. The iron acts as a reducing agent for the nickel and cobalt oxides in the slag and the simultaneous presence of sulphur has the double object of forming a matte which absorbs the liberated metals and of giving to the compound a sufficiently low melting point in spite of the presence of a large amount of metallic iron. If a particularly high yield of cobalt and nickel is desired the iron content of the matte should be as high as is possible with respect to the desired melting point of the matte. To form the desired compound of sulphur and iron, in which the proportion of such iron which is not combined with oxygen is higher than what corresponds to the formula FeS, metallic iron and ordinary ferrous sulphide may be simultaneously added to the slag, or else a compound, e. g., a sulphide containing 3 parts by weight of Fe for each part of S, may be formed and then added to the slag. A suitable manner of producing a sulphide of iron of this type, is to fuse a mixture of pyrites and iron, e. g., in an electric furnace, whereby the compound produced, chiefly consisting of sulphide of iron of the desired composition, may be directly transferred in a molten state to the slag. Since the slag often has an appreciable content of sulphur it is sometimes possible to obtain a satisfactory result by simply adding iron, e. g., in the form of powder, filings or the like, to the slag. The iron will under these conditions react with the sulphur in the slag with the formation of a sulphide matte rich in iron and having a high faculty of rapidly absorbing cobalt and nickel.

A matte of suitable composition may also in certain cases be obtained by the addition to the molten slag of other sulphur compounds having a comparatively high sulphur content, e. g., iron pyrites. In this case one of the sulphur atoms, however, will immediately distill off which may cause effervescing of the slag, particularly if the addition is made while the mixture is being stirred. This disadvantage is also encountered when using additions containing arsenic, owing to the distilling off of this latter. For this reason it is recommended, when using iron pyrites or other minerals which give off sulphur or arsenic, or both of these elements upon heating, to use a manner of addition which permits the "gassing" to take place prior to the commencing of the mixing, e. g., by applying the mineral in the form of a powder on the surface of the slag.

The described process has proven useful for the recovery of a number of metals, such as Au, Ag, Cu and particularly nickel and cobalt and may be applied for the treatment of slags from metallurgical processes in which a sulphide matte is formed, e. g., smelting of pyrites, speiss ores and similar processes, as well as for the treatment of other metallurgical slags of a corresponding nature.

We claim:

1. A process for the recovery of metals belonging to the group consisting of gold, silver, copper, nickel and cobalt, which comprises adding metallic iron and iron sulphide to siliceous slags containing the said metals and mixing at a temperature at which these materials are in a molten state, said iron sulphide having a composition corresponding to a higher content of non-oxidizing Fe than according to the chemical formula FeS.

2. A process for treating siliceous slags obtained in the matte smelting of ores containing at least one of the elements sulphur and arsenic and at least one metal belonging to the group consisting of Au, Ag, Cu, Ni and Co, for the purpose of recovering such metal from the slag, comprising the steps of separating the slag from the matte and mixing said slag in a molten state with a sulphide material chiefly consisting of iron sulphide and added iron having a composition corresponding to more than 1 atom of Fe per each atom of S, bringing said materials into intimate contact with each other while in a molten state, separating the slag and the matte thus formed and repeating the treatment with a fresh portion of said sulphide material until the desired percentage of metal has become extracted from the slag.

3. A process of treating iron-oxide-containing siliceous slags obtained in the matte smelting of ores containing at least one of the elements sulphur and arsenic and at least one of the metals in the group Au, Ag, Cu, Ni and Co, for the purpose of recovering metal values contained in said slag, comprising separating the slag from the matte formed in the smelting, separately producing a ferrous sulphide compound having an iron content higher than that corresponding to the formula FeS by fusing together an iron sulphide and metallic iron, intimately mixing said ferrous sulphide compound and said slag in a molten state and maintaining the slag and the sulphide phases in mutual contact for a sufficiently long time to permit the metals present to reach a state of equilibrium in regard to their respective concentrations in the two contacting phases, and then collecting said slag and sulphide phases separately.

4. A process according to claim 3 in which the iron sulphide fused with the iron consists of iron pyrites.

5. A process according to claim 3 in which the iron sulphide employed is substantially free from those metals which are to be extracted from the slag by contacting it with said sulphide.

6. A process according to claim 3 in which the contacting treatment of the slag with the sulphide phase, is, after separation of the two phases, repeated with a fresh portion of sulphide until the desired degree of freedom from metals is obtained in the slag.

7. A process of treating siliceous slags formed in the smelting of ores containing at least one of the elements sulphur and arsenic and at least one of the metals nickel and cobalt, for the purpose of recovering such metals contained in the slag, comprising preparing a molten mixture of iron sulphide-containing materials and metallic iron, in which the proportion of such iron which is not combined with oxygen to the total amount of sulphur present in the mixture exceeds an iron content corresponding to the formula FeS, contacting the molten slag with said sulphidic mixture and vigorously stirring the mass while in a molten state, whereby a transfer of metals to be extracted takes place from the slag to the sulphidic mixture.

8. A process according to claim 7 in which the sulphidic mixture is prepared of materials which are substantially free from the metal to be extracted.

9. A process according to claim 7 in which a sulphidic mixture also containing arsenic is used.

10. A process according to claim 7 in which the temperature at least during part of the stirring of the mass, is maintained between 1200° and 1300° C.

11. A process of treating siliceous slags recovered in the smelting of ores containing at least one of the elements sulphur and arsenic and at least one of the metals nickel and cobalt, for the purpose of recovering such metals contained in the slag, which comprises melting metallic iron and iron sulphide together in proportions such that the iron present exceeds that corresponding to the formula FeS, adding the resulting molten mixture to such a slag and vigorously stirring the mass while in a molten state by forcing a reducing gas through said mass, whereby a transfer of metals to be extracted takes place from the slag to the sulphidic mixture.

12. The process of extracting cobalt and nickel from siliceous slags containing the same, which comprises adding to such a slag while in the molten state a molten compound, formed by melting pyrites and iron together in such proportions that the iron present is greater than that corresponding to the formula FeS, stirring the resulting mixture of slag and molten compound, whereby the cobalt and nickel in the slag is extracted, and separating the molten compound from the slag.

BO MICHAEL STURE KALLING.
PER GUSTAF LENNART BRANNSTROM.